Feb. 23, 1926.
R. R. McGREGOR
1,574,100
FRONT GUARD FOR AUTOMOBILES
Filed May 7, 1925
2 Sheets-Sheet 1
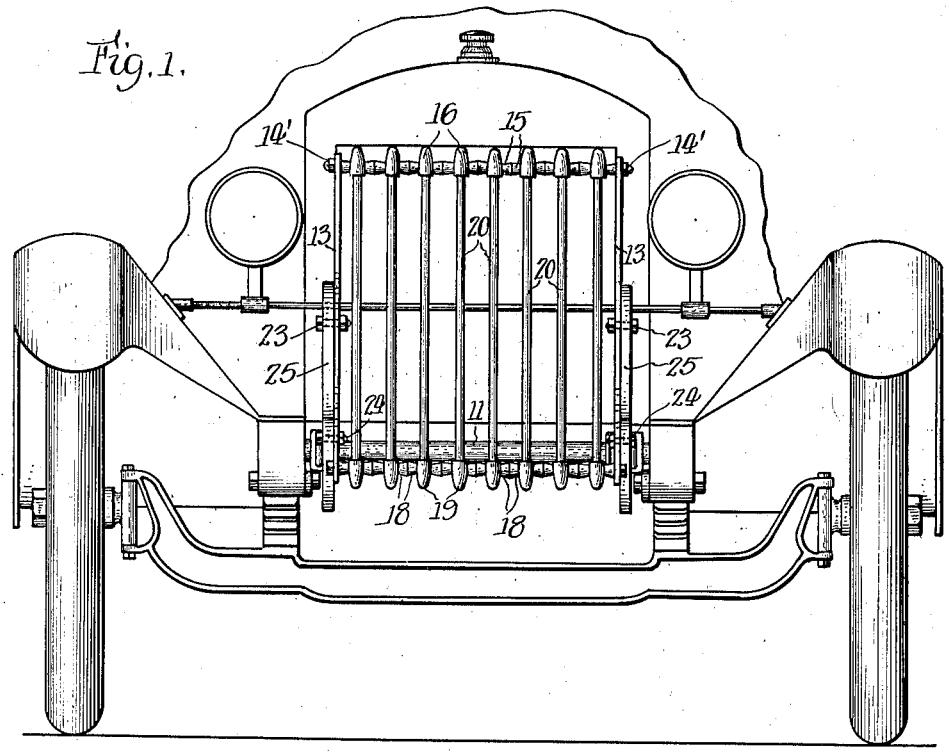
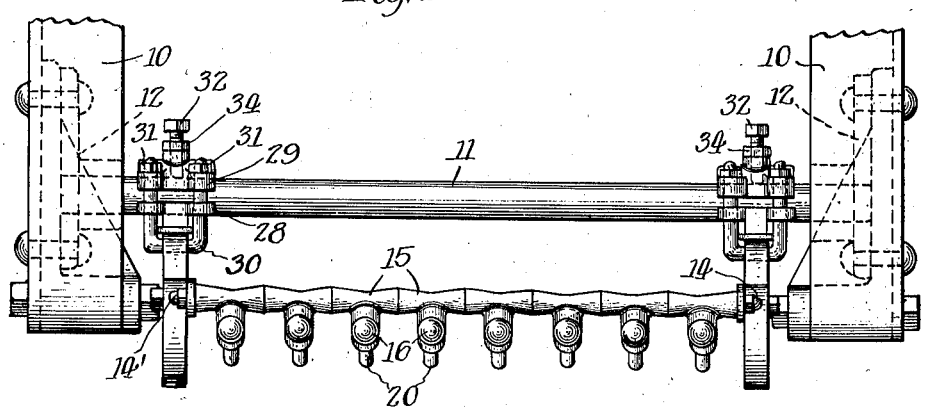
Inventor,
Robert Roy McGregor,
By Samuel N. Pond, Atty.

Feb. 23, 1926.                                                    1,574,100
                          R. R. McGREGOR
                      FRONT GUARD FOR AUTOMOBILES
                        Filed May 7, 1925            2 Sheets-Sheet 2
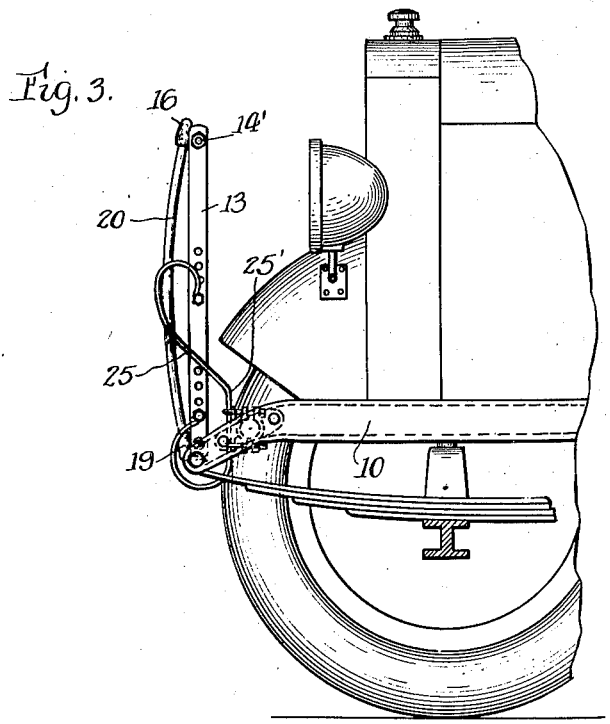
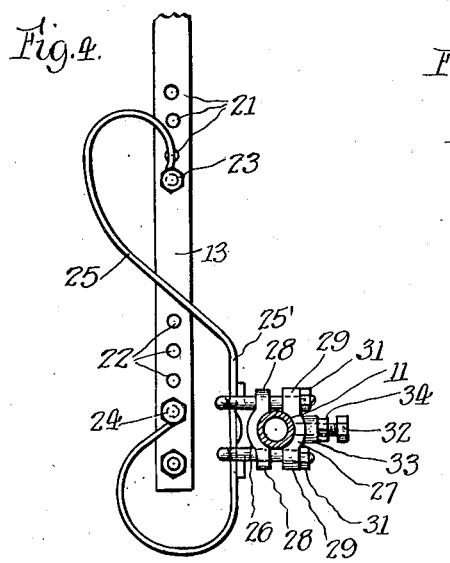
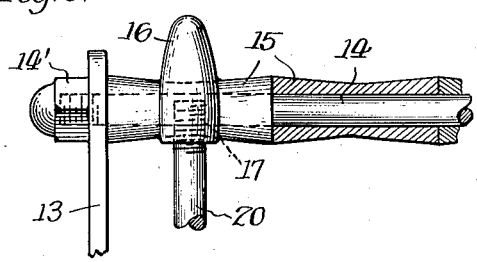
Inventor:
Robert Roy McGregor,
By Samuel N. Pond, Atty.

Patented Feb. 23, 1926.

1,574,100

UNITED STATES PATENT OFFICE.

ROBERT ROY McGREGOR, OF CHICAGO, ILLINOIS.

FRONT GUARD FOR AUTOMOBILES.

Application filed May 7, 1925. Serial No. 28,537.

*To all whom it may concern:*

Be it known that I, ROBERT ROY McGREGOR, a citizen of the United States, residing at Chicago, in the county of Cook and State of Illinois, have invented certain new and useful Improvements in Front Guards for Automobiles, of which the following is a specification.

This invention relates to protective devices for automobiles and other motor vehicles such as are commonly mounted on the front end of the vehicle frame and are designed to protect the radiator, lamps and other fragile parts from injury in the event of collision with another vehicle or stationary objects.

The main objects of the invention are, to provide an improved front guard combining the functions of a bumper and a radiator fender or protector; to provide a new and improved grid of a simple, inexpensive and efficient structure capable of being easily and quickly assembled; to provide new and improved means for mounting the grid on the front of the machine frame, said mounting means including cushioning springs through the agency of which the grid is elastically yieldable both rearwardly and angularly; to provide a grid frame and spring supports or carriers therefor of such a structure that the grid may be readily adjusted vertically with reference to its spring supports so as to protect radiators of varying heights; to provide a radiator fender or guard which may be readily mounted and supported upon the forward tie-rod which, in numerous makes of automobiles, connects and spaces the forward end portions of the side bars of the chassis frame; and, generally, to provide an improved front guard of the character specified of light and strong construction, low cost of manufacture, and neat and attractive appearance.

Other objects and attendant advantages of the invention will be apparent to persons familiar with the art from the following detailed description, taken in connection with the accompanying drawings wherein I have illustrated one simple and practical embodiment of the invention, and in which—

Fig. 1 is a front elevation of an automobile equipped with my improved guard or fender;

Fig. 2 is a top plan view of Fig. 1;

Fig. 3 is a side elevation, viewed from the right of Fig. 1;

Fig. 4 is a detail view showing in side elevation one of the S-spring supports for the grid; and Fig. 5 is an enlarged detail of the upper left hand corner of the grid, partly in vertical section.

Referring to the drawing, 10 designates the longitudinal side frame bars of the ordinary chassis, and 11 designates a tubular rod between and spacing the forward ends of the frame bars 10 and connected to the latter through brackets 12 (Fig. 2).

A rectangular grid frame is formed by flat vertical side bars 13 and top and bottom horizontal tie-rods 14 (Fig. 5) extending through the upper and lower ends of the side bars 13 and threaded to receive nuts 14'. Mounted end to end on the upper rod 14 is a group of sleeve castings 15, each formed with a central transversely disposed boss 16 formed with a tapped socket 17 in its lower end. On the lower rod 14 is mounted a corresponding group of sleeve castings 18 each formed with a central transversely disposed boss 19 having a similar tapped socket in its upper end. Threaded into the tapped sockets of opposed bosses 16 and 19 are a group of vertically disposed uniformly spaced rods 20 which, as shown in Fig. 3, lie slightly in advance of the vertical plane of the rectangular frame structure on which they are mounted and are preferably bowed slightly forwardly. By reason of such forwardly bowed form, the grid rods 20 are less liable to be permanently bent through collision than if they were straight.

In the side frame bars 13 are formed upper and lower groups of equally spaced holes 21 and 22 (Fig. 4), in corresponding holes of which groups are mounted bolts 23 and 24 that support the upper and lower ends of a pair of S-shaped bar springs 25. These springs are preferably of considerable height, approximating that of the grid itself, and the lower rear limb of each spring is straightened throughout a portion of its length to provide a flat vertical portion 25', through which the spring is attached to the rod 14 by the means clearly shown in Figs. 2 and 4. Referring to these figures, 26 and 27 designate a pair of clamp blocks concaved on their inner opposed faces to fit the rod 11 and formed with apertured corner lugs or ears 28 and 29 respectively, through which are passed a pair of U-bolts 30 secured by nuts 31; said U-bolts embracing the vertical sections 25' of the springs 25 and clamping the clamp block 26 thereto. The clamp is locked against turning on the rod 11 by a set screw 32 threaded through a boss 33 on the outer face of the clamp block 27 and secured by a lock nut 34.

The parts making up the grid may be very easily and quickly assembled by first screwing the sleeve castings 15 and 18 onto the threaded ends of the fender rods 20, then laying the said rods side by side with the sleeve castings in alinement, then passing the rods 14 through the sleeve castings, then passing the side bars 13 over the ends of the rods, and finally applying and tightening the nuts 15. This done, the large supporting springs 25 may be quickly attached by applying the fastening bolts 23 and 24; and finally the entire structure may be mounted on the rod 11 by applying the inner clamp members and U-bolts to the springs, then applying the outer clamp members, tightening the nuts 31 of the U-bolts, and finally tightening up the set screws 32.

The S-springs not only support the grid in position, but constitute highly resilient and yieldable back-stays to cushion collision blows encountered by the grid. Manifestly the latter, when struck, can yield not only bodily rearwardly but also in a forward or rearward tilting direction accordingly as the blow is received below or above the vertical center of the grid. Each spring 25 will also yield independently of the other in resisting side blows or thrusts on the grid. The described grid support thus provides a highly flexible and resilient backing for the grid which both reduces the shock of collision on the car itself and, in a measure, lessens the likelihood of deformation or other injury to the grid itself. The grid may be set higher or lower, as required by any particular installation, by adjustment of the attaching bolts 23 and 24 in the series of holes 21 and 22, respectively, in an obvious manner.

While the structural details of the device herein shown and described have been designed with a special view to effecting the stated purposes and objects of the invention, it is manifest that these details may be considerably varied or modified without departing from the substance or sacrificing any of the advantages or utilities of the invention; and hence I reserve all such variations and modifications as fall within the spirit and purview of the appended claims.

I claim—

1. An automobile fender grid comprising vertical side bars, horizontal rods connecting the upper and lower ends of said bars, sleeves mounted end to end on said rods and each formed with a lug, and rods attached at their upper and lower ends to said lugs.

2. An automobile fender grid comprising vertical side bars, horizontal rods connecting the upper and lower ends of said bars, sleeves mounted end to end on said rods and each formed centrally thereof with a transversely disposed socketed lug, and rods mounted at their upper and lower ends in said lugs.

3. An automobile fender grid comprising vertical side bars, horizontal rods connecting the upper and lower ends of said bars, sleeve castings mounted end to end on said rods and each formed on its front side centrally thereof with a transversely disposed lug having a threaded socket, and forwardly bowed rods threaded at their upper and lower ends in said lugs.

4. The combination with a substantially rectangular automobile fender grid, of a pair of springs attached to the side members of said grid and wholly supporting the latter, and means for attaching said springs to the side frame bars of an automobile chassis.

5. The combination with a substantially rectangular automobile fender grid, of a pair of S-shaped springs attached at their upper and lower ends to the side members of said grid and wholly supporting the latter, and means for attaching said springs to the side frame bars of an automobile chassis.

6. The combination with a substantially rectangular automobile fender grid, of a pair of S-shaped bar springs attached at their upper and lower ends to the side members of said grid and wholly supporting the latter, said springs formed with vertically disposed flattened portions on their lower rear sides, and means for attaching said flattened portions to the side frame bars of an automobile chassis.

7. The combination with the side frame bars of an automobile chassis, and a rod connecting and spacing the forward end portions thereof, of a substantially rectangular automobile fender grid, springs attached to the side members of said grid and wholly supporting the latter, and clamps connecting said springs to said rod.

8. The combination with the side frame bars of an automobile chassis, and a rod connecting and spacing the forward end portions thereof, of a substantially rectangular automobile fender grid, S-shaped bar springs attached at their upper and lower ends to the side members of said grid and wholly supporting the latter, said springs formed with vertically disposed flattened portions on their lower rear sides, and clamps attaching said flattened portions to said rod.

9. The combination with an automobile fender grid including vertical flat side frame bars having upper and lower series of spaced bolt holes, of a pair of S-shaped springs constituting elastic supports for said grid, and bolts connecting the upper and lower ends of said springs to said side frame bars through engagement with corresponding holes of said series, whereby said grid is vertically adjustable with reference to said supporting springs.

ROBERT ROY McGREGOR.